Sept. 9, 1924.
M. L. PACKER
GAS BURNER
Filed Feb. 9, 1924
1,507,791
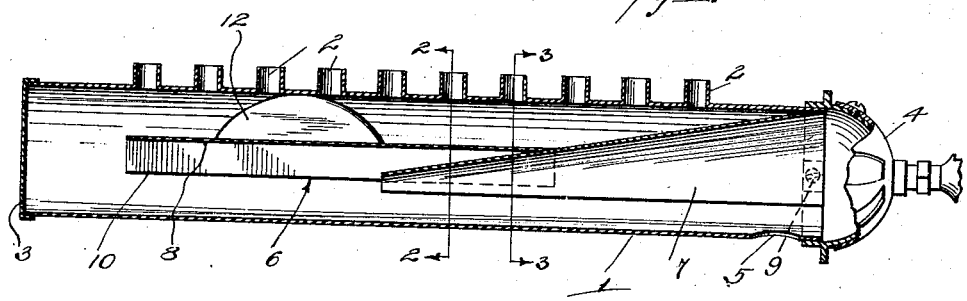
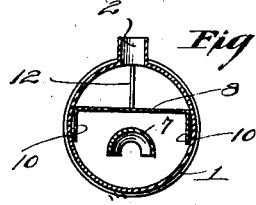
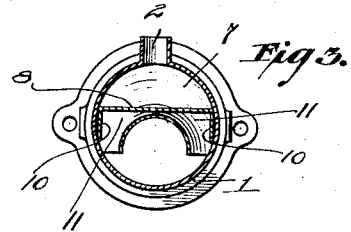
Inventor
Mortimer L. Packer
By C. C. Shephard
Attorney Patented Sept. 9, 1924.

1,507,791

UNITED STATES PATENT OFFICE.

MORTIMER L. PACKER, OF COLUMBUS, OHIO.

GAS BURNER.

Application filed February 9, 1924. Serial No. 691,597.

*To all whom it may concern:*

Be it known that I, MORTIMER L. PACKER, a citizen of the United States, residing at Columbus, in the county of Franklin and State of Ohio, have invented certain new and useful Improvements in Gas Burners, of which the following is a specification.

The present invention is directed to improvements in gas burners.

The primary object of the invention is to provide a burner of this character having a spreader mounted therein so constructed that the gas entering the burner casing will be evenly distributed throughout its length, thereby assuring that each burner tube will receive an equal amount of gas for ignition.

A further object of the invention is to provide a burner of simple yet efficient construction, the construction being such as to promote economy in fuel consumption without sacrificing the heating quality of the burner.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a longitudinal sectional view through the burner,

Figure 2 is a sectional view on line 2—2 of Figure 1, and

Figure 3 is a sectional view on line 3—3 of Figure 1.

The burner comprises a tubular casing 1 and is provided upon its upper surface with a plurality of aligned burner tubes 2, preferably ten in number, one end of said casing being closed by a cap 3. The other end of the casing has connected thereto a mixing chamber 4 and since this is of conventional form a detail description thereof is not thought necessary. The casing is provided adjacent the mixing chamber with an opening 5 to permit constant entrance of air to the casing.

Located in the casing 1 is a spreader 6 which consists of sheet metal baffle plates 7 and 8, the former being semi-circular in cross-section and tapered longitudinally, the major end thereof being of a diameter to fit snugly in the casing and is fixed thereto by screws 9, which also serve to retain the mixing chamber in place. This plate has its lower edges spaced from the bottom of the casing 1 and owing to the tapered formation the sides thereof do not contact with the sides of the casing consequently permitting gas to flow around the sides to the nearest burner tubes 2.

The baffle plate 8 is provided with depending side flanges 10 which snugly engage the sides of the casing to hold said plate centrally disposed longitudinally therein, the forward end of said plate being spaced from the cap 3 to permit gas to pass around said ends to the burner tubes. The inner or minor end of the plate 7 extends under the rear end of the plate 8 and is confined between the adjacent portions of the flanges 10 and since the plate 7 is tapered gas passages 11 are provided so that a certain amount of gas will pass from said passages to the burner tubes above the plate 7. It will be observed that the gas from the mixing chamber under pressure will first enter under the plate 7, some passing around the sides thereof to the tubes immediately above the plate. The remaining gas will be directed under the plate 8 and around the outer end thereof to the space above said plate and from thence to the burner tubes, a certain amount of gas passing from the passages 11 to the upper portion of the casing and from thence to the adjacent burner tubes. In this manner the gas is so distributed that each burner tube will receive the same amount of gas consequently causing the gas at each tube to burn evenly.

The baffle plate 8 is fixed to the plate 7 by spot-welding or in any other desired manner to prevent endwise movement thereof, there being a web 12 carried by the plate 8 for engaging the casing to brace and properly center said plate in the casing.

What is claimed is:

1. A gas burner comprising a casing, a pair of baffle plates disposed longitudinally therein the adjacent ends of said plates being arranged in overlapping relation and one of said plates being tapered.

2. A gas burner comprising a casing, a baffle plate mounted in the casing and tapered longitudinally, the sides, top and bottom thereof being spaced from the casing wall, a second baffle plate provided with flanges which engage the sides of the casing, the minor end of the first named plate being disposed in overlapped relation with the adjacent end of the second named plate to provide passages at their overlapped ends, the second plate having its outer end spaced from the adjacent end of the casing.

3. A gas burner comprising a casing a baffle plate mounted in the casing and tapered longitudinally, a second baffle plate provided with flanges which engage the sides of the casing, an end of the first named plate being disposed in overlapped relation with the adjacent end of the second named plate, the second named plate having its outer end spaced from the adjacent end of the casing.

In testimony whereof I affix my signature.

MORTIMER L. PACKER.